United States Patent [19]

Warren

[11] Patent Number: 5,339,998
[45] Date of Patent: Aug. 23, 1994

[54] AUGER FEEDING AGITATOR

[75] Inventor: Timothy C. Warren, Rochester, N.Y.

[73] Assignee: Xerox Corporation, Stamford, Conn.

[21] Appl. No.: 140,999

[22] Filed: Oct. 26, 1993

[51] Int. Cl.⁵ .............................................. G01F 11/20
[52] U.S. Cl. ................................. 222/241; 366/186; 366/293
[58] Field of Search ............... 222/240, 241, 1, 413, 222/412; 366/186, 293–296, 309, 312, 313

[56] References Cited

U.S. PATENT DOCUMENTS

| | | | |
|---|---|---|---|
| 2,415,355 | 2/1947 | Kaufmann et al. | 222/241 X |
| 2,532,913 | 12/1950 | Higginbottom | 222/241 |
| 2,589,583 | 3/1952 | Thompson | 222/241 X |
| 3,148,802 | 9/1964 | Webb | 222/241 X |
| 3,183,553 | 5/1965 | Slater | 222/241 X |
| 3,248,019 | 4/1966 | Kohler | 222/241 X |
| 3,305,133 | 2/1967 | Parker | 222/241 X |
| 3,948,421 | 4/1976 | Marchadour | 222/241 X |
| 5,080,264 | 1/1992 | Limper | 222/241 |

*Primary Examiner*—Kevin P. Shaver
*Attorney, Agent, or Firm*—Oliff & Berridge

[57] ABSTRACT

An agitator designed to continuously move powdered material into flights of a metering auger using vanes at various radii within a hopper. The agitator includes three vertically oriented stirring blades located at various radii of the hopper, the blades having differing lengths of extension into a lower portion of the supply hopper. Preferably, the blades are angled at substantially a 75° angle relative to a plane normal to a longitudinal axis of rotation.

13 Claims, 4 Drawing Sheets

AUGER FEEDING AGITATOR

BACKGROUND OF THE INVENTION
1. Field of the Invention

This invention generally relates to an agitator designed to continuously move powdered material into flights of a metering auger of a volumetric metering apparatus using vanes at various radii within a hopper.

2. Description of Related Art

Powdered material, such as toner, is packaged according to net weight, but is filled volumetrically. This is accomplished using a metering auger located at the bottom of a hopper. The metering auger turns a specific number of times, regardless of whether there is material flowing through it, dispensing a predetermined amount of material. This auger rotates at a high rate of speed, between 300-1000 rpm for dispensing toner particles. This high speed tends to draw more material out of the area around the auger than may be supplied by a conventional lower agitator or stirrer, rotating around the widest radius within the hopper.

This condition causes occasional starving of the metering auger, supplying an insufficient amount of material to the auger. Starving of the auger causes notable, and uncontrollable, variations in the amount of product delivered to the package. To accommodate this, slight overfilling of the package has been customary, ensuring that consumers receive at least a minimum stated amount of filled product. This negates an amount that may have been starved in the auger during metering.

in the previous known apparatus, there was typically between a 3-5 gram standard deviation per bottle filled. Considering the large number of toner bottle filled each year, this deviation has resulted in large amounts of excess toner being given away, at a large cost to the manufacturer.

This known apparatus, shown in FIG. 1, is not highly desirous because of the inaccuracy of the metered material. Additionally, the starved condition reduces the line rate of packages being filled.

There is a need for a more accurate volumetric metering apparatus that can be inexpensively manufactured and operated. There also is a need for improved line feed rate of packages being filled.

There are known dispensing apparatus, dispensing based on weight, that have better accuracy than the known volumetric apparatus. However, these require completely different equipment and usually are much higher in cost than traditional volumetric dispensing apparatus.

SUMMARY OF THE INVENTION

The invention therefore provides an apparatus for volumetric dispensing of particles using a metering auger that does not result in a starved feed condition.

The invention also provides an inexpensive modification to existing volumetric metering apparatus that allows improved weight control of dispensed product and increased productivity. The increased productivity results from the tighter weight control (less deviation), which allows a higher dispensing rate.

These and other objectives and advantages are provided, in a first embodiment of the invention, by a volumetric material dispensing apparatus, comprising:

a supply hopper for housing a supply of material to be dispensed, the hopper having a cylindrical top portion of a predetermined diameter and a tapering lower portion;

a cylindrical feed aperture located at a bottom end of the tapering lower portion of the hopper;

a metering auger located within the feed aperture along a longitudinal axis of the hopper;

a driving motor for rotatably driving the metering auger about the longitudinal axis at a predetermined rotational speed during metering;

a control means for controlling the rotation of the metering auger;

an agitator rotatably mounted within the hopper for rotation about the longitudinal axis, the agitator including at least three vertically oriented angled stirring blades laterally spaced along a vertical plane extending through the longitudinal axis between the longitudinal axis and one side of the supply hopper, the blades being angled with respect to the vertical plane and having differing lengths of extension into the lower portion of the supply hopper, the longest length of extension being the blade nearest the longitudinal axis and the shortest length of extension being the blade nearest the one side of the supply hopper; and a driving mechanism for driving the agitator at a rotational speed substantially slower than the rotational speed of the metering auger.

These and other features and advantages of mentioned are described in or apparent from the following detailed description of the preferred embodiments.

BRIEF DESCRIPTION OF THE DRAWINGS

The preferred embodiments are described in reference to the drawings, in which.

DETAILED DESCRIPTION OF THE PREFERRED EMBODIMENTS

Figure 1:
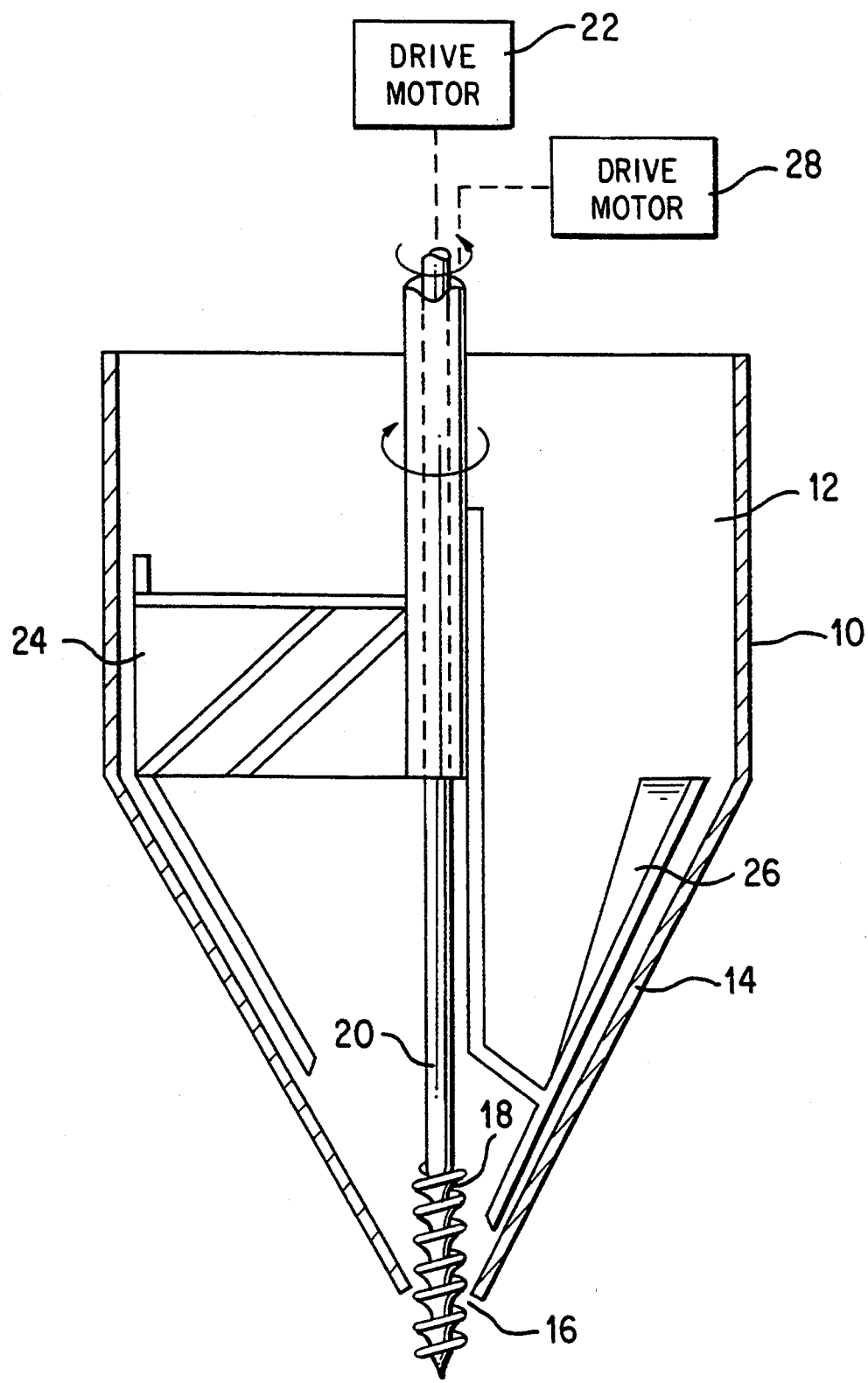
FIG. 1 shows a cross-sectional view of a prior material feeding apparatus having a conventional lower agitator and upper agitator.
Figure 2:
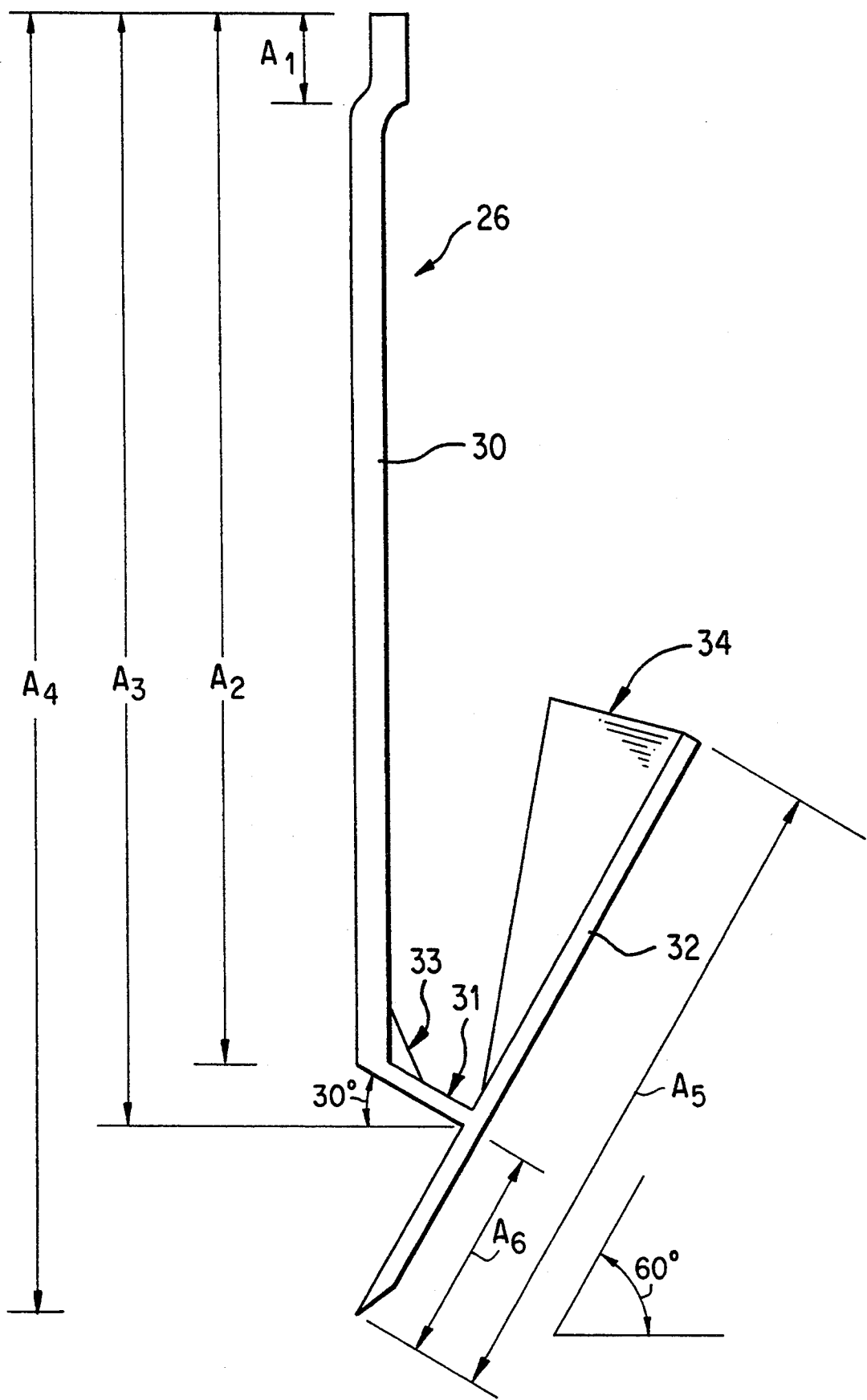
FIG. 2 shows a side view of the lower agitator of FIG. 1.

As shown in FIGS. 1 and 2, a prior volumetric material feeding apparatus includes a hopper 10 containing a supply of material 12 to be dispensed. The hopper 10 has a tapered wall 14 leading to a cylindrical feed aperture 16. A rotary metering auger 18 longitudinally extends within feed aperture 16 and is supported on a shaft 20 that extends upward through hopper 10. The upper end of shaft 20 is operatively connected to a drive motor 22, providing a predetermined rotation rate in the direction indicated in the drawings, cow rotation for auger and cw rotation for agitator.

Both an upper agitator 24 and a lower agitator 26 are provided within hopper 10, above metering auger 18, for stirring material 12 and delivering a supply of the material to metering auger 18. The upper and lower agitators 24, 26 are located on opposing sides of the apparatus and rotate together about a longitudinal axis of hopper 10 through rotation of a drive motor 28 separate from drive motor 22.

This apparatus dispenses a predetermined weight of material 12 to a bottle, located under the apparatus, by rotation of metering auger 18 a predetermined number of times. Assuming a constant supply of material at the entrance to metering auger 18 and a consistent density of material 12, this apparatus is capable of supplying (dispensing) a certain weight of product to a bottle during fill operations. However, a common occurrence with this apparatus is a condition called starving in which the agitators 24, 26 cannot keep up with the amount of material 12 dispensed by the metering auger 18, resulting in the metering auger dispensing less toner than anticipated.

To prevent a bottle from being underfilled, it has been customary to compensate for any starved condition by overfilling the average bottle by a standard deviation amount so that all bottles will have at least a required minimum weight of toner particles, accommodating any uncontrollable starved condition.

As shown in FIG. 2, the prior lower agitator 26 consists of a shaft 30, an arm 32 extending substantially parallel with the tapered portion of the hopper, and a blade subassembly 34. Arm 32 is connected to shaft 30 by a connecting member 31 structurally strengthened by a gusset 33. When used with a hopper 10 having an 11 inch radius and a depth of 3 ft., the lower agitator 26 had the following dimensions: $A_1=2''$, $A_2=23\frac{3}{8}''$, $A_3=24\frac{3}{4}''$, $A_4=29''$, $A_5=15\frac{1}{8}''$, and $A_6=4\frac{3}{4}''$.

As previously mentioned, this arrangement often resulted in a starved condition at the metering auger causing weight control problems.

Figure 3:
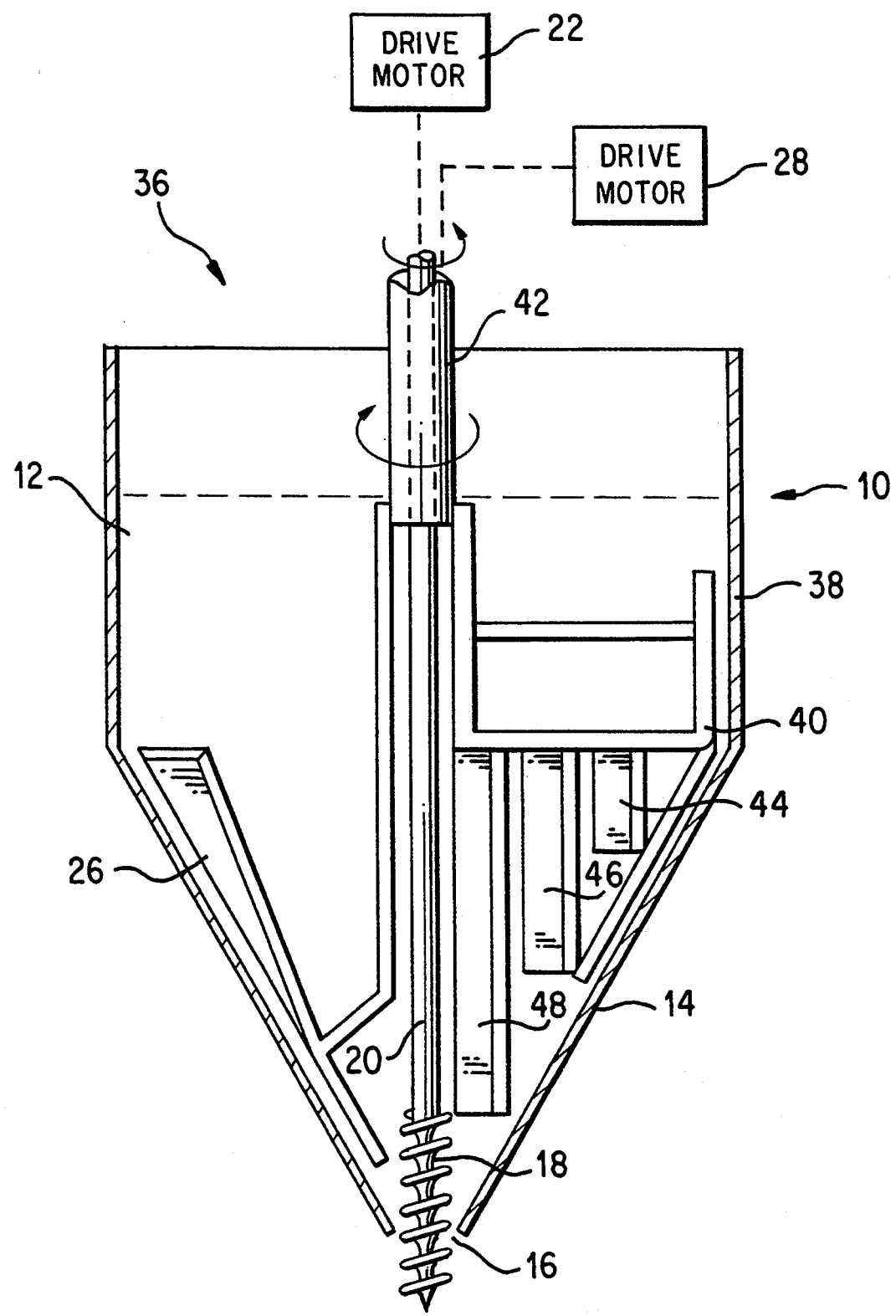
FIG. 3 shows a cross-sectional view of a material feeding apparatus according to the invention having a novel auger feeding agitator.

As shown in FIG. 3, the invention provides an improved auger feeding agitator structure that provides a more constant supply of toner at the metering auger, substantially reducing or eliminating starved conditions. The invention is utilized in a volumetric material feeding apparatus 36 comprising a hopper 10 containing a supply of material 12. In a preferred embodiment, the material is dry toner for electrophotographic processes.

Hopper 10 has a cylindrical top portion 38 and a lower tapered wall portion 14 leading to a cylindrical feed aperture 16. A metering auger 18 longitudinally extends within feed aperture 16 and is supported on a shaft 20 extending upward through hopper 10. Metering auger 18 is rotatably supported in hopper 10 by appropriate support means conventional in the art. The upper end of shaft 20 is operatively connected to a drive motor 22 through a gear box that is conventional and known in the art, providing a predetermined rotation rate in the direction indicated in the drawings.

An auger feeding agitator 40 is provided within hopper 10, above metering auger 18, for stirring material 12 and delivering a constant supply of material 12 to metering auger 18. Preferably, agitator 40 rotates around hopper 10 at a rotational speed substantially slower than that of metering auger 18. This can be accomplished by supporting agitator 40 from a second shaft 42 that rotates independent of shaft 20 and rotatably controlled by a separate drive motor 28, or alternatively driven through a suitable gear reduction system by drive motor 20 to achieve the desired rotational speed.

A typical drive system and control system for a volumetric dispensing apparatus can be found in U.S. Pat. No. 3,305,133 to Parker, incorporated herein in its entirety.

The accuracy of the dispensed toner in a volumetric feeding system depends highly on the uniform and constant feeding of material to the metering auger 18. The prior system shown in FIG. 1 fails to provide a uniform supply and often results in a starved condition at the entrance of the metering auger.

Figure 4:
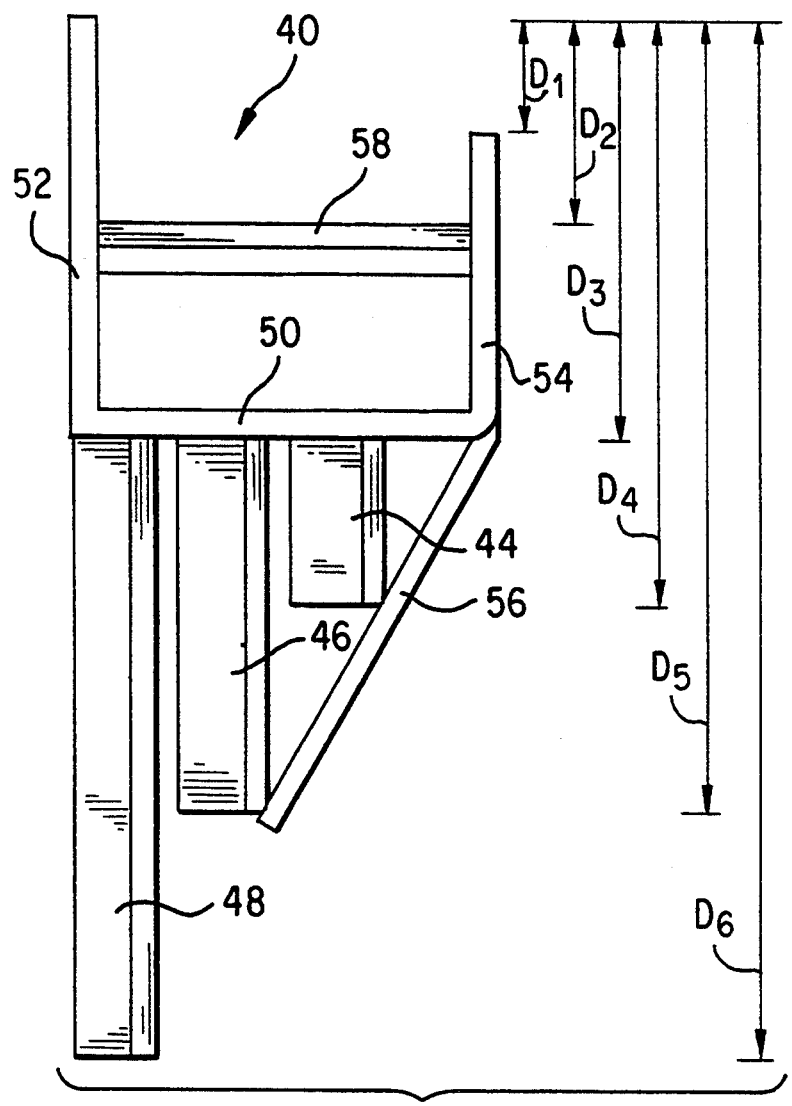
FIG. 4 shows a side view of the agitator of FIG. 3.
Figure 6:
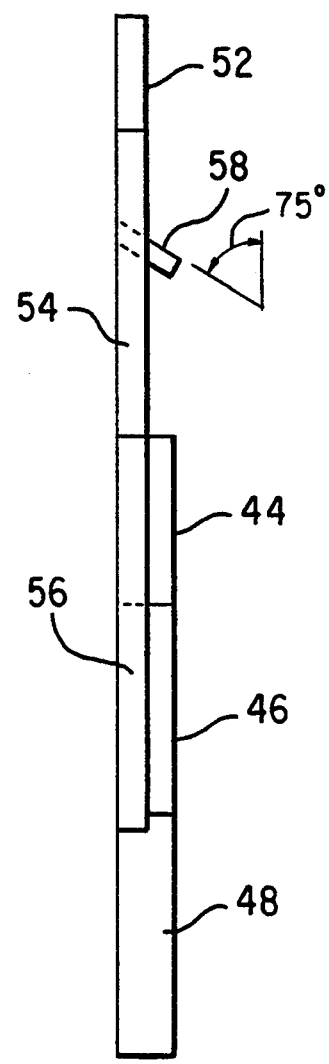
FIG. 6 shows an end view of the agitator of FIG. 3.

Because the system dispenses by rotating the metering auger a predetermined number of times to achieve dispensing of a predetermined amount of material, achieving consistent yield amounts are impossible if a starved condition sporadically exists. As previously mentioned, this required overfilling by a standard deviation amount to ensure that all filled containers had at least the required minimum amounts of toner particles. As shown better in FIGS. 4–6, the invention utilizes an auger feeding agitator 40 that more uniformly and consistently feeds toner or other particulate material 12 to metering auger 18. In addition to feeding material to auger 18, agitator 40 also serves as a stirrer for separating toner particles, preventing or breaking up any agglomerates formed by the weight of the toner particles resting in hopper 10. This results in a more uniform density of toner particles within hopper 10.

Figure 5:
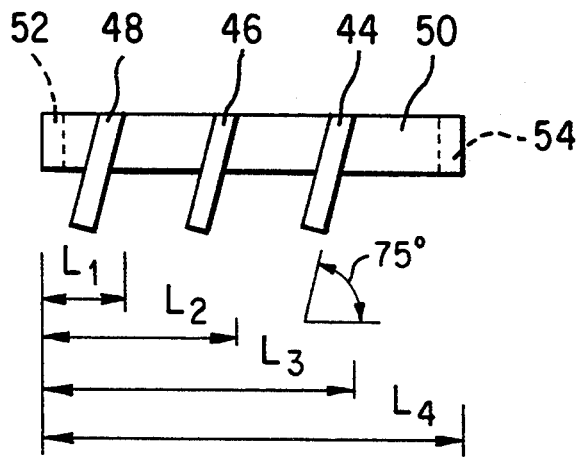
FIG. 5 shows a bottom view of the agitator of FIG. 3.

Agitator 40 includes three angled blades 44, 46 and 48 of varying length supported on shaft 42 by a support member 50. The use of an angled blade helps feed toner to auger 18. It has been found that the use of blades 44, 46 and 48 having an angle of substantially 75° as shown in FIG. 5 results in optimum delivery of toner to the metering auger. Preferably, agitator 40 rotates at a rotational speed approximately one hundred times slower than the rotational speed of metering auger 18, which typically is on the order of 300–1000 RPM.

In a preferred embodiment, support member 50 is substantially U-shaped and has side members 52 and 54. Edge member 56 may be provided to reduce product build-up on the hopper walls. Edge member 56 extends downward from support 50 at an angle substantially parallel with the tapering wall 14 of hopper 10. To further aid in feeding material to auger 18, a horizontal blade 58 may be present and located in the upper portion of hopper 10, preferably attached to and extending between side members 52 and 54. Horizontal blade 58 is preferably angled at about 75° as shown.

Preferred dimensions when the material being fed is toner in a hopper are now described, although exact dimensions will vary depending on the hopper size and the material to be fed. Support bar 50 and blades 44, 46, 48 and 58 are all made from 10 gauge stainless steel stock. The support bar is preferably of a 1" width while the blades have a 2" width. Optional edge member 56 can also be made from the same 10 gauge stock of a 1" width.

Preferred dimensions are $D_1=3\frac{5}{8}''$, $D_2=9\ 1/16''$, $D_3=14\frac{1}{4}''$, $D_4=17\frac{3}{4}''$, $D_5=21\frac{5}{8}''$, $D_6=26\frac{1}{4}''$. Preferred support member 50 length and blade spacing is $L_1=1\frac{1}{4}''$, $L_2=3\frac{3}{4}''$, $L_3=6\frac{1}{8}''$, and $L_4=8\frac{1}{4}''$.

EXAMPLE

An experiment was conducted to test the standard deviation of particles filled using the prior volumetric dispensing apparatus and the apparatus using the inventive agitator according to FIG. 3 of this invention.

Toner bottles for Xerox 1025, 1065 and 1075 copiers were filled using the prior apparatus and found to have a standard deviation of 3.3, 5.2 and 4.5 grams, respectively.

When using the same apparatus with the modified agitator 40, the standard deviation was dramatically reduced to 1.6, 3.2 and 2.1 grams for the Xerox Model 1025, Model 1065 and Model 1075 toner bottles, respectively.

These results show on an average over a 50% reduction in deviation. This allows improved weight control, as well as increased machine efficiency, because the tighter the weight control, the faster the bottles can be filled.

While the invention has been described in connection with the preferred embodiment, it will be understood that it is not intended to limit the invention to these embodiments. On the contrary, it is intended to cover all alternatives, modifications and equivalents as may be included within the spirit and scope of the invention as defined by the appended claims.

What is claimed is:

1. A volumetric material dispensing apparatus, comprising:
   a supply hopper for housing a supply of material to be dispensed, the hopper having a cylindrical top portion of a predetermined diameter and a tapering lower portion;
   a cylindrical feed aperture located at a bottom end of the tapering lower portion of the hopper;
   a metering auger located within the feed aperture along a longitudinal axis of the hopper;
   a driving motor for rotatably driving the metering auger about the longitudinal axis at a predetermined rotational speed during metering;
   a control means for controlling the rotation of the metering auger;
   an agitator rotatably mounted within the hopper for rotation about the longitudinal axis, the agitator including at least three vertically oriented angled stirring and feeding blades laterally spaced along a vertical plane extending through the longitudinal axis between the longitudinal axis and one side of the supply hopper, the blades being angled with respect to the vertical plane and having differing lengths of extension into the lower portion of the supply hopper, the longest length of extension being the blade nearest the longitudinal axis and the shortest length of extension being the blade nearest the one side of the supply hopper, the agitator further including an angled blade substantially parallel with and closely adjacent to the tapering lower portion of the hopper on an opposite side of the longitudinal axis as said at least three blades; and
   a driving mechanism for driving the agitator at a rotational speed substantially slower than the rotational speed of the metering auger.

2. An agitator for a volumetric material dispensing apparatus having a supply hopper having a cylindrical top portion of a predetermined diameter and a tapering lower portion for housing a supply of material to be dispensed, a cylindrical feed aperture located at a bottom end of the tapering lower portion of the hopper, and a metering auger located within the feed aperture along a longitudinal axis of the hopper, the agitator comprising:
   a support rotatably mounted within the supply hopper about a longitudinal axis of the hopper and extending radially outward from the longitudinal axis along a vertical plane; and
   at least three oriented stirring and feeding blades laterally spaced along the support between the longitudinal axis and one side of the supply hopper, the blades being angled with respect to the vertical plane and having differing lengths of extension into the lower portion of the supply hopper with the longest length of extension being the blade nearest the longitudinal axis and the shortest length of extension being the blade nearest the one side of the supply hopper, said blades having a substantially constant angled width that extends to an end of each blade nearest the lower portion of the hopper; and
   an angled blade substantially parallel with and closely adjacent to the tapering lower portion of the hopper on an opposite side of the longitudinal axis as said at least three blades.

3. The agitator of claim 2, wherein the blades extend from near an intersection of the cylindrical top portion and the tapering lower portion to substantially an inner wall of the tapering lower portion.

4. The agitator of claim 2, wherein the blades are fixed at an angle of approximately 75° relative to the vertical plane.

5. The agitator of claim 2, wherein the blades are formed from 10 gauge stainless steel and have an approximate width of two inches.

6. The agitator of claim 2, wherein the blades are substantially equal spaced.

7. The agitator of claim 2, wherein the hopper has substantially an 11" radius and the blades are spaced approximately $1\frac{1}{4}"$, $3\frac{3}{4}"$ and $6\frac{1}{8}"$ from an innermost end of said support.

8. The agitator of claim 2, wherein the support member is substantially U-shaped.

9. The agitator of claim 8, further comprising a laterally oriented blade extending between said U-shaped support.

10. The agitator of claim 9, wherein said laterally oriented blade is angled at substantially 75° relative to a horizontal plane.

11. The agitator of claim 2, further comprising a drive mechanism for rotatably driving the agitator about the longitudinal axis of the hopper at a predetermined rotational speed.

12. A method of uniformly feeding a particulate material to a metering auger of a dispensing apparatus and dispensing a predetermined volumetric amount of particulate matter, comprising the steps of:
   rotating the metering auger at a predetermined rotational speed for a predetermined number of revolutions; and
   rotating an agitator as claimed in claim 2 at a predetermined rotational speed substantially slower than the rotational speed of the metering auger to maintain a consistent supply of material at the metering auger for dispensing.

13. An agitator for a volumetric material dispensing apparatus having a supply hopper having a cylindrical top portion of a predetermined diameter and a tapering lower portion for housing a supply of material to be dispensed, a cylindrical feed aperture located at a bottom end of the tapering lower portion of the hopper, and a metering auger located within the feed aperture along a longitudinal axis of the hopper, the agitator comprising:
   a U-shaped support rotatably mounted within the supply hopper about a longitudinal axis of the hopper and extending radially outward from the longitudinal axis along a vertical plane, said support further comprising a laterally oriented blade angled at substantially 75° relative to a horizontal plane extending between said U-shaped support; and at least three oriented stirring blades laterally spaced along the support between the longitudinal axis and one side of the supply hopper, the blades being angled with respect to the vertical plane and having differing lengths of extension into the lower portion of the supply hopper with the longest length of extension being the blade nearest the longitudinal axis and the shortest length of extension being the blade nearest the one side of the supply hopper.

* * * * *